Figure 1:
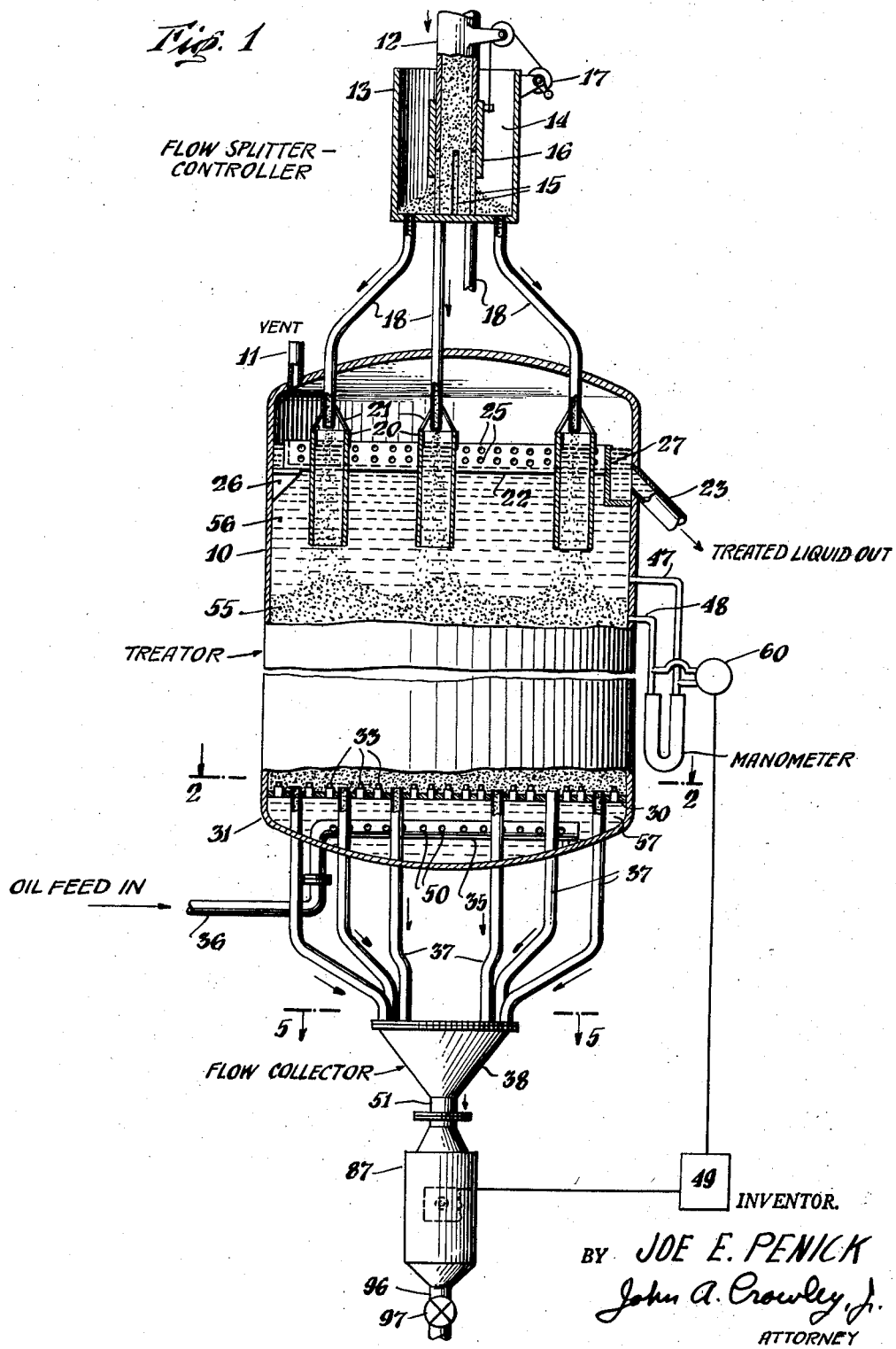

Sept. 15, 1959 J. E. PENICK 2,904,506
METHOD AND APPARATUS FOR TREATING LIQUID
HYDROCARBONS WITH MOVING ADSORBENTS
Filed July 17, 1951 3 Sheets-Sheet 2

INVENTOR.
BY JOE E. PENICK
John A. Crowley
ATTORNEY

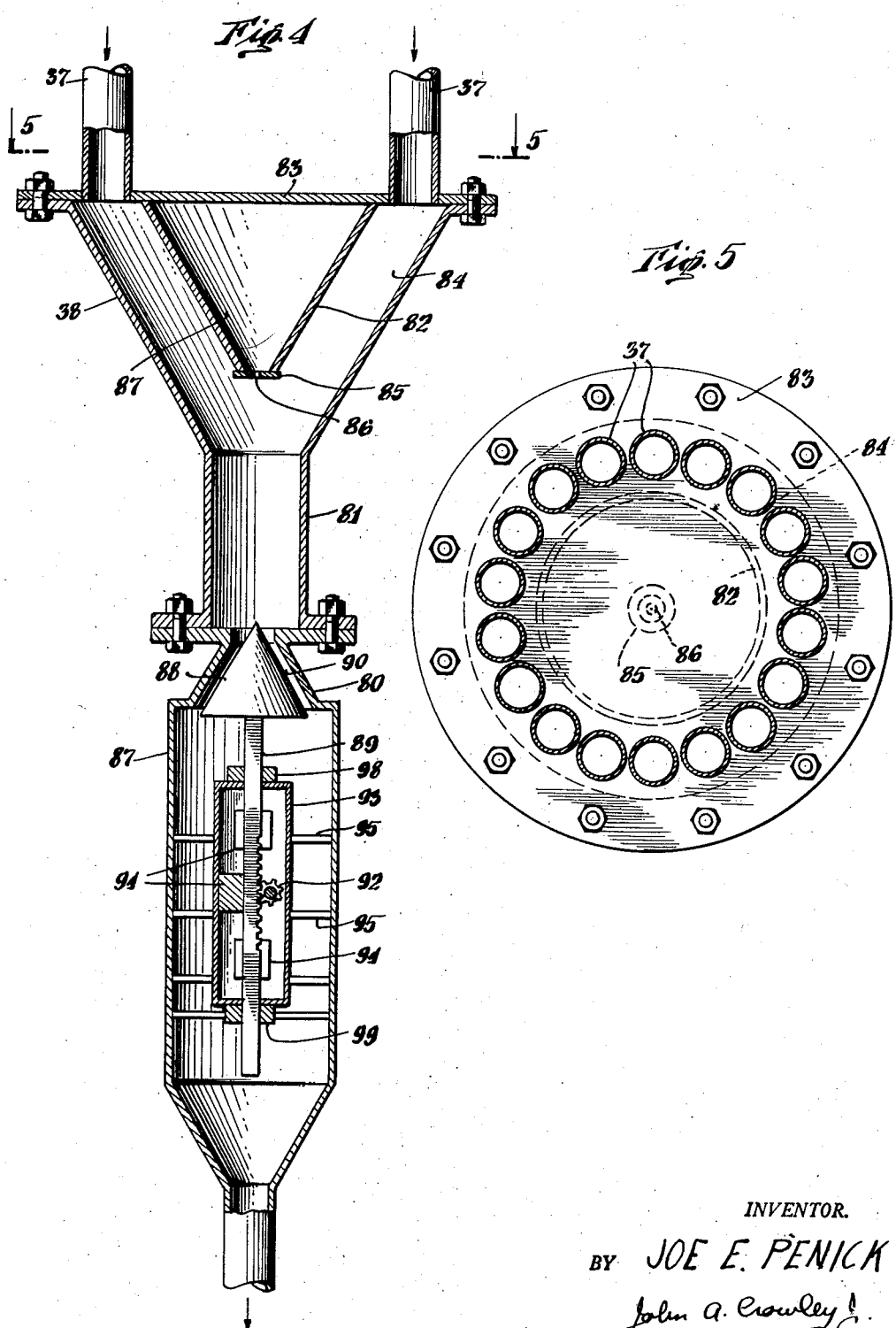

United States Patent Office 2,904,506
Patented Sept. 15, 1959

2,904,506

METHOD AND APPARATUS FOR TREATING LIQUID HYDROCARBONS WITH MOVING ADSORBENTS

Joe E. Penick, Woodbury, N.J., assignor to Socony Mobil Oil Company, Inc., a corporation of New York Application July 17, 1951, Serial No. 237,267

15 Claims. (Cl. 208—310)

This invention relates to a process for treating liquid hydrocarbons, particularly lubricating oils and lower-boiling petroleum fractions which are of low asphalt content, with solid adsorbents for the purpose of removing small amounts of impurities or undesirable contaminants therefrom. It is also applicable to processes for washing and treating adsorbents to recover liquid materals therefrom, to processes for separation of liquid materials by adsorption, and to solvent extraction processes and the like involving contacting of liquid hydrocarbons with a solid adsorbent material.

Typical of the oil treating processes with which this invention is particularly concerned are decolorization, neutralization, removal of suspended colloidal or dissolved impurities such as carbon, coke or oxygen and nitrogen-containing impurities and other gum-forming compounds and improvement of demulsibility properties of the oil.

Recently there has been developed a continuous percolation method which is applicable to processes of the kind above-mentioned. In the continuous percolation process an adsorbent of palpable particle form is caused to move downwardly as a columnar mass through a confined treating zone conutercurrently to the liquid hydrocarbons being treated. A carbonaceous contaminant is deposited on the adsorbent which reduces its treating efficiency. The spend adsorbent is passed through oil separation, washing, drying, and burning steps and then recycled at the proper treating temperature to the treating zone. Oil recovered from the spent adsorbent is recycled to the treater. This process is the subject of claims in application Serial Number 177,408, filed in the United States Patent Office on August 3, 1950, now U.S. Patent No. 2,701,786. This invention deals particularly with a method and apparatus for withdrawing wet adsorbent from the treater and adsorbent washer portions of the continuous percolation process.

It has been found that in order to attain high treating efficiencies in moving adsorbent percolation treaters and in order to accomplish efficient washing of the moving spent adsorbent to free it of occluded oil, uniform downward movement of adsorbent must be provided across the entire cross-sectional area of the treating and washing vessels. It has been found that in vessels of large cross-sectional area, such as are necessary for practical commercial scale installations, there is a tendency for adsorbent channeling through the portion of the column in the treater generally above the adsorbent outlet unless the adsorbent is withdrawn from the treater in a very particular manner. Such channeling not only prevents efficient treating of the oil but results in non-uniform deposition of carbonaceous contaminants on the adsorbent which in turn leads to adsorbent regeneration difficulties. It has been further discovered that the adsorbent must be withdrawn in a very particular manner in order to avoid interruption of flow due to plugging of the outlet by the wet adsorbent and also in order to avoid escape of excessive amounts of the liquid oil through the adsorbent outlet.

A major object of this invention is the provision in a process for effecting countercurrent contact between a liquid hydrocarbon material and a column of downwardly moving adsorbent of palpable particle form of an improved method and apparatus for withdrawing wet contacted adsorbent from the lower section of the column thereof which eliminates the above-mentioned difficulties.

A further object is the provision of an improved method and apparatus for treating liquid oils countercurrently with a column of downwardly moving adsorbent particles.

A specific object is the provision in a process for countercurrently contacting a liquid hydrocarbon material with a column of downwardly moving adsorbent particles of a method and apparatus for withdrawal of the wet contacted adsorbent from the bottom of the column thereof continuously and uniformly from all portions of its horizontal cross-sectional area.

Another specific object is the provision of a practical method for continuous withdrawal of wet contacted adsorbent from the bottom of the column thereof in a continuous percolation treater while avoiding excessive withdrawal of oil with the adsorbent and while accurately and adjustably controlling the rate of adsorbent withdrawal.

These and other objects of this invention will become apparent from the following description of the method and apparatus.

In a preferred form of this invention, the adsorbent is passed downwardly through a treating zone as a column of gravitating particles of palpable particulate form and the oil to be treated is passed upwardly through the column at a rate below the column disrupting velocity. Treated oil is withdrawn from the upper section of the treating zone and fresh adsorbent is supplied to the upper end of the column. Spent adsorbent along with some occluded oil is withdrawn from the bottom of the column as confined streams of equal cross-section extending down from a plurality of spaced points uniformly distributed across the bottom of the column. The area of column cross-section served by each of these streams is maintained below a critical minimum above which it has been found that uniform withdrawal from all portions of the column cross-section cannot be accomplished. The streams are proportionately combined to form a single discharge stream located centrally below said treating zone and the rate of flow in the initial streams is controlled by throttling the single discharge stream. The rate of flow in the initial streams is limited below a critical maximum above which it has been found that proportional combining of the flow from said streams cannot be accomplished.

In conducting this method, the adsorbent employed should be made up of palpable particles of size within the range about 4–100 mesh and preferably about 10–60 and still more preferably 15–30 mesh by Tyler Standard Screen Analysis. The particles may take the form of pellets, capsules, pills, spheres or the like or granules of irregular shape such as are obtained from grinding and screening. The terms "adsorbent in palpable particulate form" and "palpable particle form adsorbents" as employed herein in describing and in claiming this invention are intended to generically cover particles of any or all of these shapes having substantial size as distinguished from finely divided particles. The pore structure of the preferred adsorbents are of such that while micropores are present, substantially more than 30 percent of the pore volume and preferably more than 60 percent of the total pore volume is occupied by macropores (i.e., pores having radii greater than 100 Angstrom units). Typical adsorbents which may be employed are fuller's earth, bauxite, bentonite and bone char, charcoal, magnesium silicate, heat and acid activated kaolin, and activated carbon. Synthetic silica or alumina or silica-alumina gel adsorbents and the like may be employed but preferably the preparation thereof should be controlled to provide a pore structure similar to that of the clay type adsorbents wherein substantially more than 30 percent of the total pore volume is occupied by macropores. Gels of this type are described in United States Patent No. 2,188,007, issued January 23, 1940. It should be understood, however, that by proper control of the operation conditions, adsorbents of the synthetic gel type or otherwise having mostly micropores and less than 30 percent macropores may be employed in the process of this invention although with somewhat inferior results when used for lubricating oil purification. On the other hand, gels of this latter type have been found to give superior results in the treatment of distillate fuel oils by the method of this invention. Such adsorbents of this latter type are disclosed in United States Patents Nos. 2,384,946 and 2,106,744. The invention in its broadest form is intended to be applicable to adsorbents of this type as well as the preferred adsorbents of larger pore structure.

Figure 2:
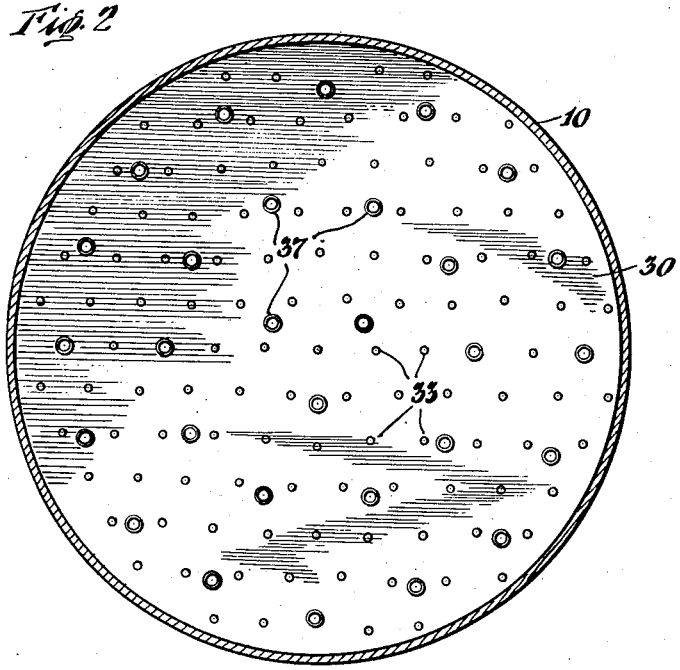
Figure 3:
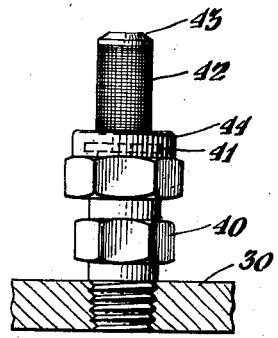
Figure 6:
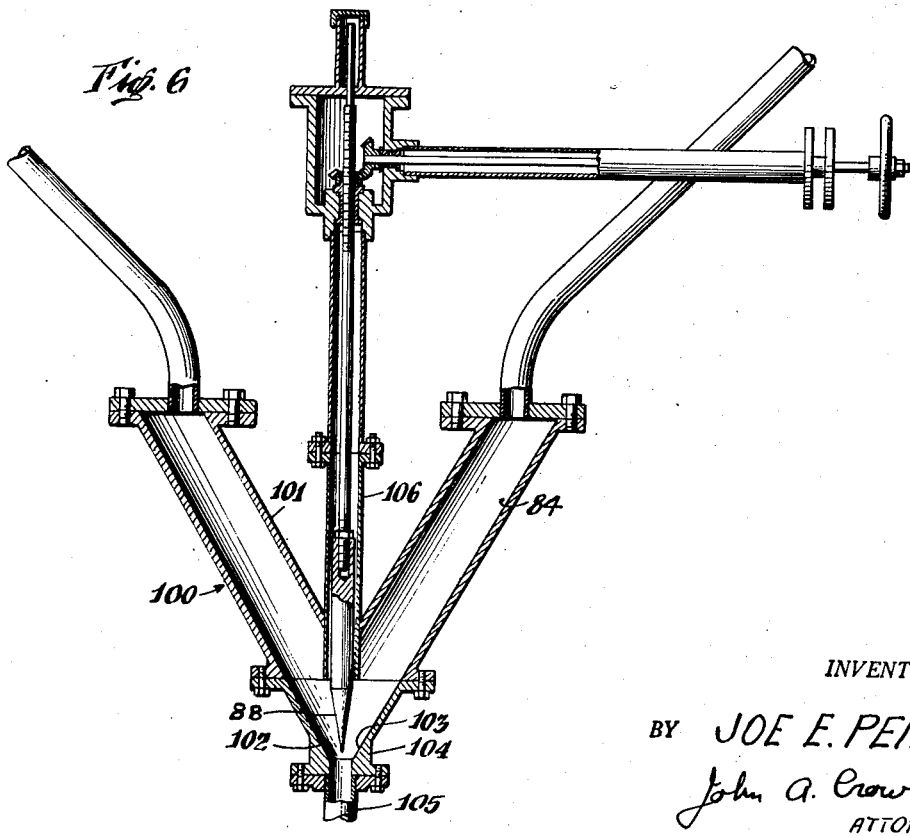

This invention may be most readily understood by reference to the drawings, of which Figure 1 is an elevational view, partially in section, of a preferred form of the invention; Figure 2 is a horizontal cross-sectional view along line 2—2 of Figure 1; Figure 3 is a detailed view, partially in section, of one of the elements of the apparatus of Figure 1; Figure 4 is an elevational view, partially in section, of the adsorbent withdrawal portion of the apparatus of Figure 1; and Figure 5 is a horizontal cross-sectional view taken along line 5—5 of Figures 1 and 4. Figure 6 is a vertical view, partially in section, of a modified form of the apparatus shown in Figure 4. All of these drawings are highly diagrammatic in form.

Turning now to Figure 1, there is shown a vertical treater 10 closed on its ends but vented to the atmosphere at its upper end by means of vent 11. The treater may be of any desirable cross-sectional shape, the vessel shown being of circular shape. Above the treater there is provided a single adsorbent feed conduit 12 which extends down from a surge or supply hopper (not shown). The conduit 12 terminates on its lower end on the bottom of the cylindrical receptacle 13 which is of substantially larger diameter than the conduit so as to provide an annular space 14 for receiving adsorbent particles issuing from vertical slots 15 provided along a lower portion of conduit 12. A slidable sleeve 16, operated by cable and crank 17, is provided to permit adjustment of the amount of slot area open for adsorbent escape from conduit 12. A plurality of pipes 18 connect through the bottom of receptacle 13 at spaced points arranged in a ring symmetrical with respect the conduit 12. These pipes extend downwardly through the top of treater 10 and terminate at their lower ends at a level in the upper section of the treater below its upper end and adjacent the open upper ends of vertical tubes 20. The adsorbent flow control and divider arrangement above described is the subject of claims in application Serial Number 237,264, now U.S. Patent No. 2,745,795, filed in the United States Patent Office on July 17, 1951. One tube 20 is suspended by means of straps 21 below the lower end of each pipe 18, the tubes being of substantially larger cross-sectional area than the pipes 18. The tubes 20 terminate on their lower ends at a common level in the upper section of the vessel 10 which is substantially below the oil collector channel 22 and outlet pipe 23 and substantially above the surface level of the adsorbent column 55. The oil collector channel or trough 22 may be open on its top and is provided with horizontal rows of spaced orifices 25 located at two vertically spaced levels along its opposite sides. The trough 22 is supported by bracket 26 on one end which is closed and by the members forming the collecting basin 27 on its opposite end. An oil outlet pipe 23 connects through the vessel wall into the basin 27. The liquid withdrawal channel and its arrangement in the treater is the subject of claims in application Serial Number 265,832 now U.S. Patent No. 2,758,070, filed in the United States Patent Office on July 10, 1952.

A horizontal partition 30 extends across the lower section of treater 10 above the bottom thereof so as to provide a plenum or liquid distribution space 31. A plurality of uniformly spaced nozzles 33 are distributed uniformly over the entire cross-sectional area of the partition 30 to provide a passage for liquid flow from the plenum space into the portion of the vessel above the partition. A plurality of adsorbent drain conduits 37 fit tightly through the partition at spaced points uniformly distributed across its cross-section and terminate on their open upper ends just above or even with the upper face of partition 30. These conduits extend downwardly through the plenum space 31 and the bottom of the treater. The lateral arrangement of the nozzles and adsorbent drain conduits on the partition 30 is shown in Figure 2. An inlet header 35 closed on its inner end is positioned across the space 31. Oil is supplied into the conduit 35 from pipe 36 which connects through the bottom of the treater and onto one end of conduit 35. A plurality of oil distributor holes 50 are arranged at spaced intervals along either side of the header 35.

The construction of the liquid passing nozzles 33 is shown in Figure 3. It will be noted that each nozzle is made up of several parts, one being a body portion 40 which screws through the partition 30 and has a central passageway for liquid flow. A circular orifice plate 41 rests on a shoulder at the top of the body portion 40. A flanged support member rests, flanged down, on the orifice. This member, which is hidden by the screen, has a central passage and lateral outlets from that passage opposite the screen. A screw 43 closes off the upper end of the central passage. The support member serves also to support the screen 42 and a screw 43 which closes off the upper end of the support member and holds down the screen. The support member and orifice plate are held in place by the nut 44. This nozzle is described in detail and claimed in application Serial Number 237,264, now U.S. Patent No. 2,745,795, filed in the United States Patent Office on July 17, 1951.

Referring again to Figure 1, the adsorbent withdrawal conduits 37, which as shown are equal in size, extend downwardly through the plenum space 31 and out through the bottom of the treater. The conduits then extend downwardly and to and through the closure plate of the collecting or stream merging device 38. Referring to Figures 4 and 5 along with Figure 1 it will be seen that the collecting device 38 is in effect a funnel shaped member comprising a hollow conical flared upper portion and a lower vertical spout 81 which is symmetrical with respect the conical upper portion and which is located on the central vertical axis toward which the conduits 37 gradually converge. An inverted hollow conical baffle member 82 is suspended from cover plate 83 so that its sides, which extend downwardly and inwardly parallel to the sides of the funnel, form with the latter an annular passageway 84 which extends downwardly and inwardly to its lower end which terminates just above the upper end of the spout portion 81. The plate 83 closes off the upper end of the annular passageway and the conduits 37 connect through the plate and then terminate at a plurality of points arranged in a circle which is symmetrical with respect the annular passage and the vertical axis of spout portion 81. The confining baffle 83 terminates at its lower end in a small flange 85 which contains an aperture 86. If desired, a gas may be introduced into the chamber 87 from which it issues as a jet through aperture 86 to clean the portion of the apparatus therebelow when desired. Connected below the funnel device is an enlarged conduit section 87 which in effect is a continuation of the spout portion 81. It will be noted that an upwardly tapered valve seat 80 is provided within the upper portion of section 87 and that a conical shaped valve gate 88 moves upwardly into the seat 80 to regulate the flow from the annular passageway 84. The gate 88 is supported on vertical shaft 89, which is arranged to slide upwardly and downwardly through bearings 98 and 99. Gear teeth are provided along an intermediate portion of the shaft length along one side thereof, and the shaft is caused to move upwardly or downwardly by means of the motor driven gear 92, the motor being located behind the section 87. The gear section is enclosed by a suitable box and the shaft 89 is held in place by bearing blocks 94. The entire assembly is supported within section 87 by means of bars 95. The section 87 tapers down on its lower end to an outlet pipe 96. A close off valve for stopping flow entirely may be provided at 97 on conduit 96. The gear 92 may be driven by hand crank and shaft to move shaft 89 upwardly or downwardly. Alternatively, a motor may be employed in conjunction with suitable speed reducers and instrumentation to raise and lower the valve gate 88.

For purposes of illustrating the operation of this invention its application to a process for decolorizing lubricating oils will be discussed. It will be noted that there is maintained throughout an intermediate portion of the treater 10 to columnar mass 55 of adsorbent of palpable particle form. As an example, the adsorbent may comprise 15–30 mesh size (Tyler) granular fuller's earth. A body of treated liquid oil 56 is maintained above the column and open to its surface entirely thereacross. A body of feed liquid 57 is maintained immediately below the column 56 in the plenum space 31 and in liquid flow communication therewith through the restricted passages formed by the nozzles 33. The particles are excluded from the restricted passages and from the liquid body in plenum space 31 by means of the screens 42 on the nozzles 33. Liquid feed oil is supplied to the body 57 via inlet 36 and distributor 35 so that the liquid is forced through the restricted passages formed by nozzles 33 into the lower end of column 55. A pressure drop is incurred due to flow through the orifices 41 which are of equal size and uniformly distributed with respect the bed cross-section, so as a result the oil enters the bed at a uniform rate over its entire horizontal cross-sectional area. The liquid oil passes upwardly through the bed at a rate controlled at the oil inlet which is below the column disrupting velocity. As a result uniform countercurrent contacting of the oil and adsorbent is effected and the oil purification and decolorization is accomplished with high efficiency. The treated oil product passes upwardly from the surface of the column 55 through the body of liquid 56. Thus very effective settling of any entrained adsorbent is effected and the treated oil leaves the treater via pipe 23 substantially free of entrained particles.

It will be noted that the soaking tubes extend down under the surface of the body of treated oil 56 and the oil rises up into the lower portion of tubes 20 substantially to the surface level of the liquid body 56. Fresh adsorbent is dropped from pipes 18, at rates controlled by the slot opening 15 so that the particles fall freely through the upper portions of tubes 20 which are free of liquid and then settle freely through the liquid oil in the lower portion of the tubes. By this procedure the adsorbent is wetted with oil and entrained air or gas is displaced and caused to escape upwardly through the tubes 20 and out through the vent 11. The wetted and degasified adsorbent discharges from the tubes 20 well above the surface of column 55 and settles through the lower portion of the treated liquid body onto the column surface. Spent wet adsorbent and some occluded oil having properties similar to the feed oil are withdrawn from the bottom of column 55 as a plurality of spaced confined streams 37 from a plurality of points uniformly spaced and distributed across the entire horizontal cross-sectional area of the column.

The confined streams 37 pass down through the body of liquid in plenum space 31 and out through the bottom of the treating zone. The streams are then caused to converge downwardly and inwardly toward a central vertical axis and they are finally merged to form the annular stream 84 in the collector 38. The flow in the annular stream 84 is caused to converge upon the central vertical axis so that finally a single central discharge stream 81 is formed. The flow in the discharge stream 81 is controlled by means of the valve arrangement located within the enlarged section 87. It will be noted that the opening for flow between the valve seat 80 and gate 88 is annular in shape, uniform in cross-section all around its periphery and symmetrically and centrally arranged with respect the annular stream 84 and the spout portion 81 of the collector. As a result a uniform rate of oil flow is maintained all around the annular stream 84 and the flow rate is the same in all of the pipes 37, which are equal in internal cross-section. Thus, by this arrangement adsorbent is continuously withdrawn at uniform rates from all portions of the horizontal cross-sectional area of column 55 and uniform downward flow of adsorbent is promoted entirely across the column.

The required rate of adsorbent throughput through the treater will, of course, depend upon the particular operation. The adsorbent throughput is adjusted to accomplish the desired treatment of the oil. Once the amount of adsorbent required for the treatment is determined, i.e., the adsorbent to oil throughput ratio, and once the oil rate is set, the adsorbent feed rate is fixed at the required value by adjustment of the sleeve 16 in the controller 14. Thereafter during that operation the rate of adsorbent feed remains fixed by the controller 14 and flow adjustments are made only at the adsorbent outlet.

Thus, the rate of downward adsorbent flow in the column 55 and the surface level of the column is controlled by adjustment of the valve plunger or gate 88. The rate of adsorbent withdrawal should be regulated to maintain the column surface level in the upper section of the treating zone substantially constant within a narrow range of levels all more than six inches below the lower ends of tubes 20. This may be accomplished by periodic measurement or notation of the column surface level followed by manual adjustment of the valve on the adsorbent discharge conduit 51 in the direction necessary to balance the column surface level. Alternatively, this may be accomplished automatically by suitable devices, one of which is shown in Figure 1. The arrangement shown involves measurement of the pressure drop due to oil flow through a vertical section of the treater between taps 47 and 48 arranged at vertically spaced points shortly above and below the desired column surface level. If the column surface level starts to rise, the measured pressure differential increases and this actuates instrument 60 which in turn actuates the motor controller 49 to drive the motor 61 located behind section 87 for a fixed time in a direction which will cause further opening of the valve 88. If the surface level starts to drop, the motor speed and adsorbent flow rates are decreased to compensate. The method described for measuring change in column level and employing such change to operate an adsorbent flow control valve is the subject of claims in United States Patent 2,850,438 to Bodkin et al.

Another method for automatic column surface level measurement and control which may be employed involves the use of a float to measure the column surface level and actuate the valve driving mechanism. Such a method is the subject of claims in United States Patent 2,850,439 to Bodkin.

While the system disclosed in Figure 1 constitutes the preferred form of the invention it is contemplated that within the spirit and scope of the invention the elements thereof may be subject to substantial variation from the particular details of design and arrangement shown in Figure 1. For example, any suitable means known to the art may be employed for supplying fresh adsorbent to the upper ends of tubes 20 at a controlled or fixed rate. In vessels of relatively small cross-sectional area only one soaking tube 20 may be required. Means other than that shown may be substituted for effecting withdrawal of the liquid oil from the upper portion of the liquid body 56. For example, the outlet device may simply comprise one or more pipes connected to the vessel shell at the proper level.

Also in the cases of treaters of large diameter it may be desirable to divide the adsorbent column into sectors by vertical partitions and to supply one or more soaking tubes 20 for each sector of the column in the treater. The partitions may extend through the entire length of the column 55 or through only an upper, lower or intermediate portion thereof. It is considered that the present invention in its broadest form is not restricted to any particular method for adsorbent supply to the treater or treated liquid withdrawal therefrom.

It is further contemplated that the method for introduction of liquid into the lower section of the column and for maintaining the body of feed liquid below the column may be modified from that shown. For example, simple orifices or nipples of restricted internal diameters may be substituted in partition 30 for nozzles 38 and a screen may be arranged across the vessel above the partition to prevent adsorbent particles from entering the orifices and the body of liquid therebelow. Baffle plates may be provided over the orifices to disperse the flow. Also, instead of the partition 30, a number of uniformly distributed liquid feeder pipes may be positioned across the lower section of the treater with orifices arranged along the lengths of the pipes so as to provide uniform orifice distribution over the entire vessel cross-section. The orifice openings may be suitably screened and baffled. Such alternative arrangements are disclosed and claimed in application Serial Number 237,266, now U.S. Patent No. 2,773,012, filed in the United States Patent Office on July 17, 1951. It will be understood that the terms "restricted passages" and "restricted passageways" are employed herein in describing and claiming this invention in a broad sense as covering orifices, nozzles, nipples of small internal diameter and other suitable passageways of restricted cross-section adapted to accomplish the function of oil distribution in the manner described.

It is further contemplated that the collecing device may have side walls of other than conical shape. For example, the horizontal cross-sectional shape of the basin formed by the outer sidewalls and of the annular passageway formed between member 82 and the outer sidewalls may be square or octagonal. The terms "annular passageway" and annular passage" as employed herein in claiming this invention shall be used when referring to the passageway 84 in this broad sense and not merely in the sense of a passageway of circular cross-sectional shape. In all cases the collector device should be of symmetrical cross-sectional shape so that the annular passageway formed therein is of symmetrical cross-section and is arranged symmetrically with respect the central discharge passage therebelow. It is contemplated that the throttling device associated with the discharge conduit 51 may vary in design and location from that described hereinabove. An alternative and less preferred arrangement is shown in Figure 6. Referring to Figure 6, the collecting device is formed of two hollow inverted conical members 100 and 101 spaced apart one above the other on a common vertical axis so as to define the annular passageway 88 therebetween. A central opening 102 is provided in the bottom of the lower cone and a needle valve seat 103 is positioned immediately adjacent the opening and within the flanged nozzle 104. A drain conduit 105 is connected below the nozzle 104. It will be noted that in this case the plunger 88 of the needle valve moves into the valve seat from above rather than from below and is enclosed in a body portion 106 which connects through the apex of the upper cone 101. The closure plate 83 is of the ring type in this arrangement.

It is also contemplated that the throttling device may take the form of a slide plate which is provided with orifices of different size which may be inserted between flanges on the single withdrawal conduit 51 as desired.

It will be apparent that within practical limits the operating conditions of the method and the design dimensions and details of the apparatus of this invention may vary over substantial ranges depending upon the particular process to which the invention is applied and the characteristics of the adsorbent and liquid involved and the size scale of the operation. However, certain general limits have been found important and at some points critical.

It has been found that the number of adsorbent withdrawal streams 37 per given area of column cross-section must be maintained above a certain critical minimum otherwise channeling and low treating efficiency will result in the continuous percolation process. Thus, referring to Table I, there is presented data obtained in continuous percolation of blends consisting of equal volumes of an intermediate naphtha and Duo-Sol treated Mid-Continent base petroleum oil over a 30–60 mesh fuller's earth adsorbent to reduce the oil color from about 73 to 100 Lovibond down to about 35–73 Lovibond, respectively. The data presented are taken from operations in which the superficial rate of the oil flow through the treater was about 3–6 cubic feet per hour per square foot of treater cross-section.

Table 1

| Number of adsorbent outlets per sq. ft. of column horizontal cross-sectional area | Relative treating efficiency |
|---|---|
| 0.059 | 0.47 |
| 0.20 | 0.84 |
| 0.31 | 1.00 |
| 0.57 | 1.03 |
| 0.91 | 0.94 |

The number of adsorbent withdrawal streams should in all cases be sufficient so that the adsorbent is withdrawn from all portions of the column cross-section and the column horizontal cross-sectional area per adsorbent withdrawal stream is substantially less than about 17 square feet and preferably less than about 12 square feet. Further, it has been found that when the rate of flow through the individual pipes 37 is too high, it is impossible to insure proportionate flow from the several equal pipes 37 into the annular passageway 84 and into discharge conduit 81 even though the collector arrangement is perfectly symmetrical. It has been found that in order to insure proportionate flow from all pipes 37 the maximum rate of the wet adsorbent mixture flow through any pipe 37 should be maintained below about 350 cubic feet per hour per square foot of cross-section to flow in that pipe. (This is on a wet adsorbent basis not including any oil which may be removed in the stream apart from that wetting the adsorbent.) Once the number of the pipes 37 has been determined within the limits above set then size should be selected so that they may handle the expected normal adsorbent throughput for accomplishing the desired oil treatment or decolorization without exceeding the maximum velocity mentioned above. The throttling valve 88 serves not only to permit control of the column surface level in the treater but also to restrict the flow through the several pipes below the critical maximum. It has been found that in general the total cross-sectional area for flow in all of the pipes 37 should be less than 10 percent of the total horizontal cross-sectional area of the column in the treater and usually it is less than one percent thereof. The pipes 37 are preferably equal in cross-section for flow and evenly spaced across the treater. However, it is within the broad scope of this invention to provide pipes which are not equal in size but which are distributed so as to provide eqal distribution of adsorbent withdrawal stream area over the entire column. The pipes in such cases must be spaced around the annular passageway 84 in such a manner that the flow from the pipes is in proportion to their respective areas for flow.

It has been found that adsorbent withdrawal pipes 37, the annular passageway 84 and the single discharge conduit should all have internal cross-sectional dimensions in every direction greater at least equal to about 20 times the diameter of the largest adsorbent particle handled, otherwise the wet adsorbent may bridge and stop the flow in these passages. When orifices are employed to throttle the flow in any of these passages, the orifice should have a diameter at least equal to 5 times the diameter of the largest adsorbent particle handled.

It is preferable to locate the throttling device on the single central discharge conduit 51 below its upper end by a distance at least equal to 2½ times the equivalent diameter of the discharge conduit in order to provide room for ironing out localized flow disturbances or non-uniformities in flow caused by the throttling device, thereby insuring uniform flow rates all across the upper end of the discharge conduit 51. Preferably the throttling device should be designed either to provide a central passageway or an annular passageway which is arranged symmetrically with respect the conduit 51 and more particularly with respect the annular passageway 84. With such an arrangement the adsorbent stream flows at a uniform rate from all around the lower end of the annular passageway to the symmetrically arranged metering passage, even though the metering passage is located closely adjacent the central opening immediately below the lower end of the annular passageway.

The operating conditions within the treater may involve temperatures within the range atmospheric to 700° F. and pressures near or moderately below or in excess of atmospheric pressure. The relative amounts of adsorbent and liquid oil feed passed through the treater depend upon the degree of decolorization or other treatment desired. In general, the volumetric ratio of liquid oil measured at 60° F. to adsorbent (packed density) falls within the range 0.3 to 30.

The superficial velocity of the liquid oil through the treater should be within the range ½–20 feet per hour and preferably within the range 1–10 feet per hour (based on oil at treating temperature and free cross-sectional area of treater when empty). In all cases, the oil velocity should be controlled below that which would interfere with the downward direction of flow of the adsorbent particles. While some expansion in the columnar mass due to oil flow may be tolerated, oil velocities should be avoided which are so high as to cause the adsorbent particles to move upwardly through the treating zone since such high velocities would prevent true countercurrent contacting of the oil and adsorbent with resultant decrease in the efficiency of the treating process.

In general, the adsorbent particles touch each other as they move downwardly within the column so that it may be said that in this portion of the treating zone the adsorbent is the continuous phase whereas in the portion of the treater occupied by the body of treated oil above the surface of the column, the liquid oil is the continuous phase. In order to properly maintain the columnar mass in the condition above discussed, the superficial velocity of the liquid hydrocarbon in the portion of the treater occupied by the adsorbent column should be maintained below the maximum defined by the equation, $$-V = \frac{250{,}000 D^2}{Z}\left(\frac{Sa}{1-F}\right)\left(1 - \frac{S_L}{S_T}\right)$$

where V is the superficial velocity of the oil in feet per hour (calculated on the basis of the total zone cross-sectional area when empty of adsorbent), Z is the viscosity in centipoises of the liquid oil under the conditions in the treating zone, $Sa$ is the apparent density of the dry adsorbent in grams per cubic centimeter (conveniently determined by pouring a sample of adsorbent into a graduated container without agitation of the container and then weighing a measured amount), $S_T$ is the true density of the dry adsorbent in grams per cubic centimeter, $S_L$ is the density of the liquid oil under the conditions in the treating zone in grams per cubic centimeter, F is the fraction of voids between the adsorbent particles under the same conditions at which the apparent density is determined and D is the average adsorbent particle diameter in inches (calculated by averaging the reciprocal of the particle diameters). In the above equations, D is above 0.01 inch, Z is below 560 centipoises, V is within the range 0.5 to 20 feet per hour, and F is usually within the range about 0.3–0.55. Preferably the superficial velocity should be below that defined by the equation, $$-V = \frac{125{,}000 D^2}{Z}\left(\frac{Sa}{1-F}\right)\left(1 - \frac{S_L}{S_T}\right)$$

Broadly the oil viscosity should be below 500 centipoises and usually a viscosity in the range of about 5 centipoises is preferred.

The vertical length of the adsorbent column in the treating zone should be greater than about 5 feet and preferably from 10–50 feet. If desired, the invention may be applied to the adsorbent washing step of the continuous percolation process wherein occluded oil is washed from a downflowing column of adsorbent by means of an upwardly percolating solvent such as petroleum naphtha, carbon tetrachloride, carbon disulfide or normal heptane. In general, the same limits discussed hereinabove apply to the washing step except that the operation temperature may be somewhat lower.

As an example of this invention, an apparatus was constructed in the manner disclosed in Figure 1. The treater measured 8 feet in diameter and the column height above partition 30 was about 17 feet. The depth of the feed liquid body below the column was about 1.2 feet and of the treated liquid body above the column about 3.0 feet. The adsorbent was supplied through six soaking tubes 1½ feet in length and 9 inches in internal diameter. The feed pipes 18 were 1 inch standard pipe size. The channel 22 was omitted and the oil outlet pipe 23 was located 6 inches below the top of the tubes 20. The adsorbent column surface was maintained about 18 inches below the lower ends of tubes 20.

In the partition 30 there were provided 115 nozzles 33 on 8 inch centers with 0.086 inch orifices therein. Adsorbent was withdrawn through 29 two inch standard pipe size conduits. These pipes discharged into the top of the collector 38 in a 2 feet diameter ring of spaced points. The annular passageway 84 was about 4 inches in width and extended down at 60 degrees. The discharge conduit 81 was a 6 inch standard pipe size and the flow was controlled by insertion of suitable orifices in this conduit at a level 2½ feet below its upper end.

In a typical operation, a blend consisting of equal volumes of intermediate naphtha and a Duo-Sol treated bright stock from a Mid-Continent base crude, having an initial color of 100 Lovibond was supplied to the treater via pipe 36 at a rate of 640 barrels per day. The superficial oil velocity in the column was about 3 feet per hour. The treating temperature was about 77° F., the pressure about atmospheric and the oil viscosity under treater conditions about 5.2 centipoises.

Treated oil withdrawn at pipe 23 was substantially free of adsorbent and had a color of 44 Lovibond. The adsorbent employed was 15–30 mesh size (Tyler) fuller's earth which was passed through the treater at a rate of 550 pounds per hour which was about 0.072 pound of adsorbent per pound of treated oil product. About 3.3 barrels of oil per hour were withdrawn from the treater with the spent adsorbent. This oil was separated from the adsorbent and recycled to the treater. The adsorbent was washed, dried and regenerated and returned at its original activity to the treater for reuse therein.

It is intended to cover all changes and modifications of the examples of the apparatus and of the operation of this invention herein chosen for purposes of disclosure which do not constitute departure from the spirit and scope of the invention.

I claim:

1. In a process for countercurrently contacting liquid hydrocarbons and an adsorbent material wherein the liquid hydrocarbons are supplied to a common level in the lower section of a columnar mass of downwardly gravitating adsorbent of palpable particle-form and passed upwardly through said mass, said mass being greater than 17 square feet in horizontal cross-sectional area, the method for withdrawing used adsorbent uniformly from all portions of the lower section of said columnar mass so as to promote uniform downward movement of the particles within said columnar mass over its entire horizontal cross-section which comprises, withdrawing the contacted adsorbent along with some of the liquid hydrocarbons downwardly as a plurality of confined equal streams from a plurality of spaced points uniformly distributed across the lower section of said columnar mass at a common level, which level is substantially the same as the level of liquid hydrocarbon supply, said streams drawing adsorbent from the entire horizontal cross-section of said columnar mass and the area of columnar mass feeding each stream being substantially less than 17 square feet and proportionately combining said streams into a single confined discharge stream while maintaining said first named streams and the single discharge stream confined throughout the combining region and throttling the flow at some point along said discharge stream to control the rate of flow through said first named streams, the flow rate in each of said first named streams being restricted below about 350 cubic feet of adsorbent-oil mixture per hour per square foot of stream cross-sectional area.

2. In a process for treating liquid hydrocarbons by passing the same into the lower section of a columnar mass of downwardly gravitating adsorbent of palpable particle-form on a single level and then upwardly through said mass, which mass is greater than 17 square feet in horizontal cross-section, the method for withdrawing used adsorbent uniformly from all portions of the lower section of said columnar mass so as to promote uniform downward movement of the particles within said columnar mass over its entire horizontal cross-section which comprises, withdrawing the contacted wet adsorbent downwardly as a plurality of confined equal streams from a plurality of spaced points uniformly distributed across the lower section of said columnar mass at a common level, which level is substantially the same as the level of hydrocarbon supply, said streams drawing adsorbent from the entire horizontal cross-section of said columnar mass and the area of columnar mass feeding each stream being substantially less than 17 square feet, flowing said streams downwardly and inwardly toward a common centrally located vertical axis, said streams moving at all times at slopes at least 45 degrees, proportionately merging said streams to form a common central, confined discharge stream while confining the merging streams and the single discharge stream from the exterior throughout the merging region and throttling the flow in said discharge stream to limit the rate of wet adsorbent flow in each of said first named streams below about 350 cubic feet of adsorbent oil mixture per hour per square feet of stream cross-sectional area, whereby equal flow is maintained in all of said first named streams.

3. In a process for countercurrently contacting liquid hydrocarbons which remain in the liquid phase during the contacting and an adsorbent material wherein the liquid hydrocarbons are supplied to a single level within the lower section of a columnar mass of downwardly gravitating adsorbent of palpable particle-form and then upwardly through said mass, which mass is greater than 12 square feet in horizontal cross-sectional area, the method for withdrawing used wet adsorbent uniformly from all portions of the lower section of said columnar mass so as to promote uniform downward movement of the particles within said columnar mass over its entire horizontal cross-section which comprises, withdrawing the contacted adsorbent along with some of the liquid hydrocarbons downwardly as a plurality of confined equal streams from a plurality of spaced points uniformly distributed across the lower section of said columnar mass at a common level, which level is substantially the same as the level of liquid supply, said streams drawing adsorbent from the entire horizontal cross-section of said columnar mass and the area of columnar mass feeding each stream being substantially less than about 12 square feet, directing said streams downwardly and inwardly toward a central vertical axis at an angle with said axis not in excess of about 45 degrees, merging said streams at a common level to form a confined annular stream symmetrical with respect to said central axis, said first named streams delivering into the upper end of said annular stream at a plurality of points uniformly spaced in a ring around said central vertical axis, the upper end of said annular stream being confined from the exterior, converging said annular stream downwardly and inwardly to form a single central, confined discharge stream having said central vertical axis as its axis, said single discharge stream being confined from the exterior along the entire region where it is formed from said converging annular stream, throttling the flow in said single central stream at a point spaced below the upper end thereof at least 2½ times the equivalent diameter of said single stream to limit the rate of wet adsorbent flow in any one of said first named streams below about 350 cubic feet of wet adsorbent per hour per square foot of stream cross-sectional area, whereby equal flow is maintained in all of said first named streams.

4. A process for contacting liquid hydrocarbons by counter-current contact with a moving adsorbent material which comprises, passing an adsorbent in palpable particle form downwardly as a column of gravitating particles through a confined contacting zone, said column being greater than 17 square feet in horizontal cross-sectional area, introducing the liquid hydrocarbon feed into the lower section of said column on a single level and passing it upwardly therethrough at a velocity controlled below the column disrupting velocity, withdrawing contacted liquid from the upper section of said contacting zone, supplying adsorbent to the upper section of said column, withdrawing contacted adsorbent mixed with some of the liquid oil from the lower section of said column as a plurality of confined equal streams extending downwardly from a plurality of points, at a common level uniformly spaced and distributed across the entire horizontal cross-sectional area of said column, said level being substantially the same as the level of liquid introduction, said streams together drawing adsorbent from all portions of the column cross-section and each stream being supplied with adsorbent from less than 17 square feet of the column cross-section, causing said streams to converge downwardly and inwardly toward a common central vertical axis, combining said streams at a location centrally below said contacting zone to form a single central, confined discharge stream having said vertical central axis as its axis while confining said converging streams and the central discharge streams from the exterior throughout the combining region, causing the combined stream to pass vertically down through a metering passage which is symmetrically arranged to insure proportionate flow from each of the initial streams into said single central stream and restricting the flow by said metering passage to limit the wet adsorbent flow in each of said equal streams below about 350 cubic feet of wet adsorbent per hour per square foot of cross-section for flow in each of said equal streams.

5. A process for decolorizing and treating oils to low asphalt content which comprises, maintaining a column of adsorbent of palpable particulate form throughout a substantial portion of the length of a confined treating zone, said column being greater than 12 square feet in horizontal cross-sectional area, passing the oil to be treated into the lower section of said column on a single level and upwardly through said column at a rate controlled below that which seriously disrupts said column, disengaging the treated oil from said column and withdrawing it from the upper section of said treating zone, supplying fresh adsorbent to the upper end of said column at a fixed, constant rate suitable for effecting the desired degree of decolorization of said oil, withdrawing used adsorbent mixed with some oil from the lower end of said column as a plurality of horizontally spaced confined streams, said streams originating on a common level which is substantially the same as the level of liquid supply to said column and said streams being arranged to withdraw proportional amounts from all portions of the horizontal cross-sectional area of said column and the maximum area of the column feeding any one stream being less than about 12 square feet, whereby uniform downward movement of the particles is promoted entirely across said column and adjustably controlling the rate of withdrawal in said confined streams to maintain the surface level of said column substantially constant within said treating zone.

6. A process for treating liquid hydrocarbons with a moving adsorbent in which the hydrocarbons are maintained as a liquid throughout the treating which comprises, maintaining a column of adsorbent of palpable particle-form within a confined treating zone, said column being greater than 12 square feet in horizontal cross-sectional area, passing the liquid hydrocarbon material into the lower section of said column on a single level and upwardly through said column at a rate below that which would seriously disrupt said column, whereby the hydrocarbon material is treated, withdrawing the treated liquid hydrocarbon from the upper section of said treating zone, supplying adsorbent to the upper end of said column at a fixed, constant rate suitable for effecting the desired treatment of the hydrocarbon material, withdrawing contacted adsorbent along with occluded liquid hydrocarbon material downwardly as a plurality of confined equal streams from a plurality of points distributed uniformly at a common level across the lower section of said column, said level being substantially the same as the level at which liquid is passed into said column and there being at least one of said streams for each 12 square feet of column horizontal cross-sectional area and the cross-section of said equal streams being such that the rate of wet adsorbent flow through each stream is less than about 350 cubic feet per hour per square foot of stream cross-section when the total rate of adsorbent withdrawal from said column is equal to said rate of adsorbent supply to said column, flowing said streams downwardly and inwardly at slopes of at least 45 degrees toward a common centrally located vertical axis, proportionately merging said streams to form a common central discharge stream while confining said merging streams and the common discharge stream from the exterior throughout the merging region and adjustably controlling the flow in said single central discharge stream at a point at least 2½ times the equivalent diameter of said single stream below the location where said streams merge thereinto.

7. A method for effecting countercurrent contact between a liquid hydrocarbon which is maintained in liquid condition throughout the contacting and an adsorbent of palpable particle form which comprises, supplying the adsorbent to the upper portion of a confined contacting zone and passing it downwardly therethrough as a columnar mass of gravitating particles, introducing the liquid hydrocarbon at a single level in the lower section of said columnar mass, passing the liquid hydrocarbon upwardly through said columnar mass at a velocity controlled below that which would interfere with the uniform downward flow of the adsorbent particles, withdrawing the contacted liquid hydrocarbon from the upper section of said contacting zone, withdrawing a plurality of confined streams of contacted adsorbent mixed with some liquid hydrocarbon material from a plurality of points uniformly spaced and distributed across the lower section of said column at a common level which is substantially the same level as that of the liquid hydrocarbon introduction, the maximum horizontal cross-sectional area of column for each stream being less than 12 square feet and the minimum cross-sectional dimension of said stream being at least 20 times the diameter of the largest of said particles of adsorbent and throttling the flow from said streams.

8. A process for decolorizing and treating oils of low asphalt content which comprises, maintaining a column of adsorbent of palpable particulate form throughout a substantial portion of the length of a confined treating zone, said column being greater than 12 square feet in horizontal cross-sectional area, passing the oil to be treated into the lower section of said column on a single level and upwardly through said column at a rate controlled below that which seriously disrupts said column, disengaging the treated oil from said column and withdrawing it from the upper section of said treating zone, supplying fresh adsorbent to the upper end of said column, withdrawing used adsorbent along with some occluded oil downwardly as a plurality of confined equal streams from a plurality of spaced points uniformly distributed across the lower section of said column at a common level, said level being substantially the same as the level of oil supply and the number of said streams being such that there is less than 12 square feet of column cross-sectional area per stream, directing said streams downwardly and inwardly toward a central vertical axis at an angle with said axis not in excess of about 45 degrees, merging said streams at a common level to form a confined annular stream symmetrical with respect said central axis, said first named streams delivering into the upper end of said annular stream at a plurality of points uniformly spaced in a ring around said central vertical axis, converging said annular stream downwardly and inwardly until the flow combines to form a single central, confined discharge stream while confining the annular stream and single discharge stream from the exterior throughout the combining region, causing the combined flow to pass downwardly through a symmetrically shaped metering passage which is centrally and symmetrically disposed below said annular passage so as to promote proportionate flow to the metering passage from all portions of the horizontal cross-section of said annular stream and controlling the restriction to flow imposed by said metering passage to restrict the flow of wet adsorbent in each stream below about 350 cubic feet per hour per square foot of stream cross-section for flow.

9. An apparatus for effecting countercurrent contacting of liquid hydrocarbons with an adsorbent of palpable particle form which comprises, an elongated upright contacting vessel, means to introduce liquid hydrocarbon feed into the lower section of said vessel and means to withdraw contacted liquid from the upper section thereof, means to supply adsorbent to the upper section of said vessel, a plurality of adsorbent withdrawal conduits, open on their upper ends, extending downwardly from a common level within the lower section of said vessel from a plurality of horizontally spaced points uniformly distributed over the cross-sectional area of said vessel, said conduits being equal in size and sufficient in number so that there is less than 17 square feet of vessel horizontal cross-sectional area for each withdrawal conduit, an upright symmetrical funnel shaped member positioned centrally below said vessel, said funnel member having a flared upper portion and a symmetrically arranged vertical spout portion, an inverted tapered member positioned within the flared portion of the funnel member and having sides which slope downwardly and inwardly substantially parallel to the sides of the funnel member to form therebetween, an annular passageway which extends downwardly and inwardly to terminate immediately above the spout portion of the funnel member, said withdrawal conduits extending downwardly at slopes of at least 45 degrees and terminating on their open lower ends at a plurality of spaced points arranged uniformly around the upper end of said annular passage and symmetrical with respect the vertical axis of said funnel member.

10. An apparatus for effecting countercurrent contacting of liquid hydrocarbons with an adsorbent of palpable particle form which comprises, an elongated upright contacting vessel, means to introduce liquid hydrocarbon feed into the lower section of said vessel and means to withdraw contacted liquid from the upper section thereof, means to supply adsorbent to the upper section of said vessel, a funnel member positioned centrally below said vessel, said funnel member having a conical upper portion and a symmetrical, vertical spout portion, an inverted conical baffle arranged within said conical portion so as to form therebetween an annular passage which terminates at its lower end immediately above the upper end of said spout portion, a throttling device on said spout portion at a distance below its upper end at least 2½ times its diameter, a closure member across the upper end of said annular passageway, a plurality of adsorbent withdrawal conduits, open on their upper ends, extending downwardly from a common level within the lower section of said vessel from a plurality of horizontally spaced points uniformly distributed over the cross-sectional area of said vessel, said conduits being equal in size and sufficient in number so that there is less than 12 square feet of vessel horizontal cross-sectional area for each withdrawal conduit, said conduits having minimum cross-sectional dimensions which are at least 20 times the diameter of the adsorbent particles and said conduits extending downwardly at slopes of at least 45 degrees and connecting through said closure member at a plurality of equally spaced points arranged in a ring around said closure member symmetrically with respect the vertical axis through said spout portion.

11. In an apparatus for effecting countercurrent contacting of a liquid hydrocarbon material with a column of downwardly moving adsorbent particles in an upright contacting vessel the improved means for uniform withdrawal of wet contacted adsorbent and occluded liquid from the lower section of said contacting vessel which comprises, an upright symmetrical funnel shaped member positioned centrally below said contacting vessel, said funnel member having an upper flared portion terminating on its lower end in a vertical symmetrically arranged spout portion, a roof member extending downwardly and inwardly over said tapered portion to define therebetween an annular passageway which extends downwardly and inwardly to terminate immediately above the upper end of said spout portion, a horizontal closure plate across the upper end of said annular passageway, a throttling device associated with said spout portion, a plurality of conduits, open on both ends, extending downwardly from a plurality of spaced points uniformly distributed across the horizontal cross-sectional area of said vessel at a common level in the lower section thereof and terminating on their lower ends at least through said closure plate, said conduits being sufficient in number so that there is less than 17 square feet of vessel horizontal cross-sectional area per conduit and said conduits passing through said closure plate at a plurality of spaced points arranged uniformly around the upper end of said annular passageway symmetrical with respect the vertical axis of said funnel member.

12. An apparatus for treating liquid oils with adsorbents of palpable particle form which comprises, a vertical upright vessel adapted to confine a column of said adsorbent, means to supply adsorbent into the upper section of said vessel and means to withdraw treated oil from the upper section of said vessel, a partition across the lower section of said vessel a short distance above its upper end so as to define a plenum chamber in the lower end of said vessel, a plurality of spaced restricted passageways distributed uniformly over the entire horizontal cross-sectional area of said partition for flow of liquid oil from said plenum space to the portion of the vessel thereabove, means to supply liquid oil feed into said plenum chamber, a plurality of adsorbent withdrawal conduits, open on both ends, extending vertically through said partition and terminating shortly thereabove at a plurality of horizontally spaced points distributed uniformly with respect the horizontal cross-sectional area of said partition, said conduits being equal in cross-section and sufficient in number so that there is more than one conduit for each 17 square feet of partition horizontal cross-sectional area, an upright symmetrical funnel shaped member positioned centrally below said contacting vessel, said funnel member having an upper flared portion terminating on its lower end in a vertical symmetrically arranged spout portion, a roof member extending downwardly and inwardly over said tapered portion to define therebetween an annular passageway which extends downwardly and inwardly to terminate immediately above the upper end of said spout portion, a horizontal closure plate across the upper end of said annular passageway, a throttling device associated with said spout portion adapted to provide a restricted metering passage in said spout portion which is symmetrical with respect said annular passageway, said adsorbent withdrawal conduits extending downwardly at slopes of at least 45 degrees and connecting through said closure plate at a plurality of spaced points arranged uniformly around the upper end of said annular passageway symmetrical with respect the vertical axis of said funnel member.

13. An apparatus for effecting countercurrent contacting of liquid hydrocarbons with an adsorbent of palpable particle form which comprises, an elongated upright contacting vessel, means to introduce liquid hydrocarbon feed into the lower section of said vessel and means to withdraw contacted liquid from the upper section thereof, means to supply adsorbent to the upper section of said vessel, a plurality of adsorbent withdrawal conduits, open on their upper ends, extending downwardly from a common level within the lower section of said vessel from a plurality of horizontally spaced points uniformly distributed over the cross-sectional area of said vessel, said conduits being equal in size and sufficient in number so that there is less than 17 square feet of vessel horizontal cross-sectional area for each withdrawal conduit, a collecting basin positioned centrally below said vessel, said basin being of symmetrical cross-sectional shape and having sides which converge downwardly and inwardly toward a central symmetrically arranged opening in its bottom, a roof member extending downwardly and inwardly over said basin to define therebetween an annular passageway, which annular passageway slopes downwardly and inwardly from the top of said basin down to said central opening, a closure member across the upper end of said annular passageway, said withdrawal conduits extending downwardly at slopes of at least 45 degrees and extending through said closure member to terminate at the upper end of said annular passageway at a plurality of equidistant spaced points arranged around said annular passageway, a member connected to the lower end of said basin defining an enclosed passageway for flow downwardly from said opening in the bottom of said basin and an adjustable flow throttling device associated with said member adapted to define a metering passage for flow which is arranged symmetrically with respect said opening so that proportionate flow is drawn from all portions of the cross-section of said annular passageway through said metering passage.

14. A process for decolorizing petroleum oils while in liquid condition with a moving columnar mass of decolorizing adsorbent of palpable particle form which comprises, supplying the adsorbent to the upper portion of a confined contacting zone and passing it downwardly therein as a columnar mass of gravitating particles, said mass being greater than 12 square feet in horizontal cross-sectional area, passing the liquid oil into the lower section of said mass on a single level and upwardly through said columnar mass at a velocity controlled below that which would interfere with the uniform downward flow of the adsorbent particles, withdrawing decolorized liquid oil from the upper section of said contacting zone, withdrawing a plurality of confined streams of used adsorbent mixed with some liquid oil from a plurality of points uniformly spaced and distributed across the lower section of said columnar mass at a common level, which level is substantially the same as the level at which liquid is passed into said mass and the streams being arranged to limit the area of the columnar mass from which material enters each stream substantially below about 12 square feet, controlling the flow in said confined streams so that proportionate amounts of material are withdrawn from all parts of the columnar mass cross-sections and restricting the flow through said confined streams below about 350 cubic feet of adsorbent and oil mixture per hour per square foot of stream cross-sectional area, whereby the adsorbent is withdrawn at uniform rates from all sections of the horizontal cross-section of said columnar mass.

15. In a process for countercurrently contacting liquid hydrocarbons and adsorbent material wherein the liquid hydrocarbons, at a viscosity below 500 centipoises, are passed upwardly through a columnar mass of downwardly gravitating adsorbent of palpable particle-form, said mass being greater than 12 square feet in horizontal cross-section, the method for withdrawing contacted adsorbent uniformly from different portions of the columnar mass cross-section which comprises, withdrawing the contacted adsorbent along with some of the liquid hydrocarbons downwardly from a plurality of points uniformly distributed across the lower section of said columnar mass as a plurality of confined streams flowing through a plurality of passages, being of a horizontal cross-sectional area amounting to only a minor fraction of the horizontal cross-sectional area of said mass and the total of the horizontal cross-sectional area of all of said passages being less than the horizontal cross-sectional area of said mass controlling the flow in said confined streams so that proportionate amounts of material are withdrawn from the different parts of the columnar mass cross-section and restricting the flow from said streams to maintain the flow through each stream below about 350 cubic feet of adsorbent and hydrocarbon mixture per hour per square foot of stream cross-sectional area, whereby proper control on the rates of flow through all of the streams is insured.

References Cited in the file of this patent
UNITED STATES PATENTS

| Number | Name | Date |
|---|---|---|
| 2,393,893 | Evans et al. | Jan. 29, 1946 |
| 2,412,135 | Evans | Dec. 3, 1946 |
| 2,470,339 | Claussen et al. | May 17, 1949 |
| 2,552,436 | Bennett et al. | May 8 1951 |
| 2,564,717 | Olsen | Aug. 21, 1951 |
| 2,701,876 | Evans et al. | Feb. 8, 1955 |

UNITED STATES PATENT OFFICE
CERTIFICATE OF CORRECTION

Patent No. 2,904,506                                                 September 15, 1959

Joe E. Penick

It is hereby certified that error appears in the printed specification of the above numbered patent requiring correction and that the said Letters Patent should read as corrected below.

Column 1, line 38, for "conutercurrently" read -- countercurrently --; column 7, line 52, for 'annular passage"' read --"annular passage"--; column 11, line 16, for "departure" read -- departures --; column 13, line 14, for "oils to low" read -- oils of low --.

Signed and sealed this 15th day of March 1960.

(SEAL)
Attest:

KARL H. AXLINE                                                    ROBERT C. WATSON
Attesting Officer                                              Commissioner of Patents